R. T. GRIFFITHS, O. ANDERSON AND J. O. GOODWIN.
TIRE BUILDING MACHINE.
APPLICATION FILED SEPT. 26, 1919.

1,368,393.

Patented Feb. 15, 1921.
9 SHEETS—SHEET 1.

R. T. GRIFFITHS, O. ANDERSON AND J. O. GOODWIN.
TIRE BUILDING MACHINE.
APPLICATION FILED SEPT. 26, 1919.

1,368,393.

Patented Feb. 15, 1921.

Inventors:
Richard T. Griffiths,
Olaf Anderson, &
John O. Goodwin,
by their Attys.

R. T. GRIFFITHS, O. ANDERSON AND J. O. GOODWIN.
TIRE BUILDING MACHINE.
APPLICATION FILED SEPT. 26, 1919.

1,368,393.

Patented Feb. 15, 1921.

Inventors:
Richard T. Griffiths,
Olaf Anderson, &
John O. Goodwin,
by their Attys.

R. T. GRIFFITHS, O. ANDERSON AND J. O. GOODWIN.
TIRE BUILDING MACHINE.
APPLICATION FILED SEPT. 26, 1919.

1,368,393.

Patented Feb. 15, 1921.
9 SHEETS—SHEET 8.

Inventors:
Richard T. Griffiths,
Olaf Anderson,
John O. Goodwin,
by *Spian Middleton Donaldson Hall*
Atty's.

UNITED STATES PATENT OFFICE.

RICHARD T. GRIFFITHS, OLAF ANDERSON, AND JOHN O. GOODWIN, OF AKRON, OHIO, ASSIGNORS TO THE MILLER RUBBER COMPANY, OF AKRON, OHIO, A CORPORATION OF OHIO.

TIRE-BUILDING MACHINE.

1,368,393.  Specification of Letters Patent.  Patented Feb. 15, 1921.

Application filed September 26, 1919. Serial No. 326,467.

*To all whom it may concern:*

Be it known that we, RICHARD T. GRIFFITHS, OLAF ANDERSON, and JOHN O. GOODWIN, citizens of the United States, and residents of Akron, Ohio, have invented certain new and useful Improvements in Tire-Building Machines, of which the following is a specification.

Our present invention relates to improvements in tire building machines and aims to provide mechanism which will automatically remove a core bearing a finished carcass from the chuck and replace it with a fresh core, and which will automatically apply to the core the requisite parts and build up the complete carcass ready to receive the tread in a simple, expeditious and effective manner.

The invention also aims to provide many new or improved features as will hereinafter appear and the invention comprises the novel construction and arrangement and combination of parts defined by the appended claims.

An embodiment of our invention is illustrated in the accompanying drawings in which—

Figs. 5$^a$, 5$^b$ and 5$^c$ are sectional detail views of the core supporting rollers.

Referring by reference characters to these drawings all of the mechanism is mounted upon a rigid base or sole-plate 1, and is mostly supported upon three supporting frames 2, 3 and 4, securely bolted to the sole plate.

The invention embodies mechanism for supporting and driving a tire core upon which the carcass is built at a single uniform speed, means for releasing the core supporting means from the driving force, and means for chucking or releasing the core from the supporting means. This mechanism is all supported by the frame 2, and may be described as follows:

Frame 2 is provided with bearings 2$^a$, 2$^b$, in alinement with each other in which a horizontal quill shaft 5 is mounted for rotation. Keyed to the inner extremity of quill shaft 5 is a three armed chuck body 6, the arms of which extend radially therefrom and are equidistantly spaced and bored to receive sliding plungers 7 and coil springs 8. The inner extremities of the coil springs 8 abut against shoulders on the plungers 7 and their outer extremities abut against cap bushings 9 threaded into the chuck arms and having a central bore through which the reduced portions of the plungers 7 are free to slide, the plungers being normally forced inward toward the axis of chuck body 6 or retracted by the pressure of springs 8. The plungers 7 are provided at their outer extremities with extension points 10 for supporting a core and these may be replaced with points of different lengths for accommodating cores of various diameters. Slidably mounted in quill-shaft 5 is a solid shaft 12 which extends into chuck body 6 and is connected to a plunger block 13 slidably mounted therein which plunger block 13 is provided with three equally spaced inclined keyways 13$^a$ which are engaged by rollers 11 carried by the inner ends of the plungers for the double purpose of preventing rotation of the plungers 7 and forcing them radially outward against the tension of the springs to engage the tire core. A female cone clutch 14, carrying a sprocket 15 keyed thereon, is mounted in frame 2, on quill shaft 5, for free rotation thereon. A male companion clutch part 16 is feather keyed to the quill shaft 5, in suitable position to engage clutch part 14, or be disengaged therefrom, as desired, for the purpose of connecting or disconnecting the sprocket 15, to quill shaft 5.

The parts above described including the chuck body, radially movable arms, and automatic operating means therefor constitute what is known in shop practice as automatic core chucking means.

A motor, 17, mounted on the base plate 1, furnishes the power for driving the machine and may be connected to or disconnected from the driving shaft 18 by a suitable clutch 19. The shaft 18 carries a worm 20 mounted thereon, which meshes with a worm wheel 21, located within the frame 2 and rigidly mounted upon a horizontal shaft 22. Shaft 22 is rotatably supported in bearings $2^c$, $2^d$, $3^a$ and $3^b$ in frames 2 and 3 and has keyed thereon a sprocket 23 in vertical alinement with sprocket 15. A sprocket chain 24 (illustrated conventionally for convenience) surrounds sprockets 15 and 23 for the purpose of transmitting power to the quill shaft 5. A horizontal shifter rod 25 slidably mounted in frame 2 carries at one extremity a shifter fork 26 engaging the clutch 19 and has its other extremity connected to a hand lever 27 by means of which the shifter rod may be operated to engage or disengage clutch 19.

A rocking shifter fork 28, pivotally mounted on a stud 29 within frame 2, engages a clutch yoke 30 which in turn embraces an annular groove in the clutch part 16. The stud 29 is journaled in a bifurcated bracket 31 rigidly mounted on frame 2. A rocker arm 32, also pivoted on stud 29, is provided at one end with a boss $32^a$ which encircles a stud $28^a$ threaded into shifter fork 28, the stud $28^a$ forming an adjustable connection between rocker arm 32 and fork 28 and being locked in position by lock nut $28^b$. The lower end of rocker arm 32 is provided with a cam roller 33' engaged in a cam groove in cam 34, on shaft 68, as hereinafter more fully described. Rotation of the cam 34 will, through the described mechanism, connect or disconnect shaft 5 from the source of power and thereby control the rotation of the chuck.

A similar shifter fork 35 pivoted on a stud 36 on the same bracket 31 but outside of frame 2 engages a yoke 37, embracing shaft 12, and is operated by a similar rocker arm 38, pivoted on stud 36, and flexibly or yieldably connected to shifter fork 35 by the interposed spring $38^a$. Rocker arm 38 is provided with a cam roller 39 engaging a cam groove in a second cam 40 fast on shaft 68 and through the described mechanism, shaft 12 and consequently chuck plungers 7 are operated by cam 40 in the proper sequence to engage and release the core.

The machine is also provided with a cradle mechanism for receiving a core upon which a tire is to be built and transferring the core (shown by dotted lines at C) to the proper position to be engaged by the chucking mechanism just described and removing it from this position after the tire has been built thereon and this mechanism may be described as follows:

Frame 3 is provided with bearings $3^c$, $3^d$, (in alinement with bearings $2^a$, $2^b$,) in which a shaft 41 is slidably mounted, provided near its center with notches $41^a$. A rocker arm 42, pivotally mounted on a stud 43 carried by a bracket 44 bolted to the frame 3, is provided at its upper end with a fork $42^a$ which embraces the notches $41^a$, and at its lower end with a cam roller 45 engaging a cam groove in cam 46 mounted upon shaft 68 whereby said cam groove effects the endwise movement of shaft 41 at the proper times.

Shaft 41 carries at its inner extremity a spider bracket 47 mounted thereon, and a similar spider bracket 48 is stationarily supported on the hub $2^b$ of frame 2. Guide rods 49 carried by spider 47 enter corresponding guide holes in frame 3 (Fig. 3) and prevent rotation of spider 47 but allow movement of spider 47 axially.

Figure 3:
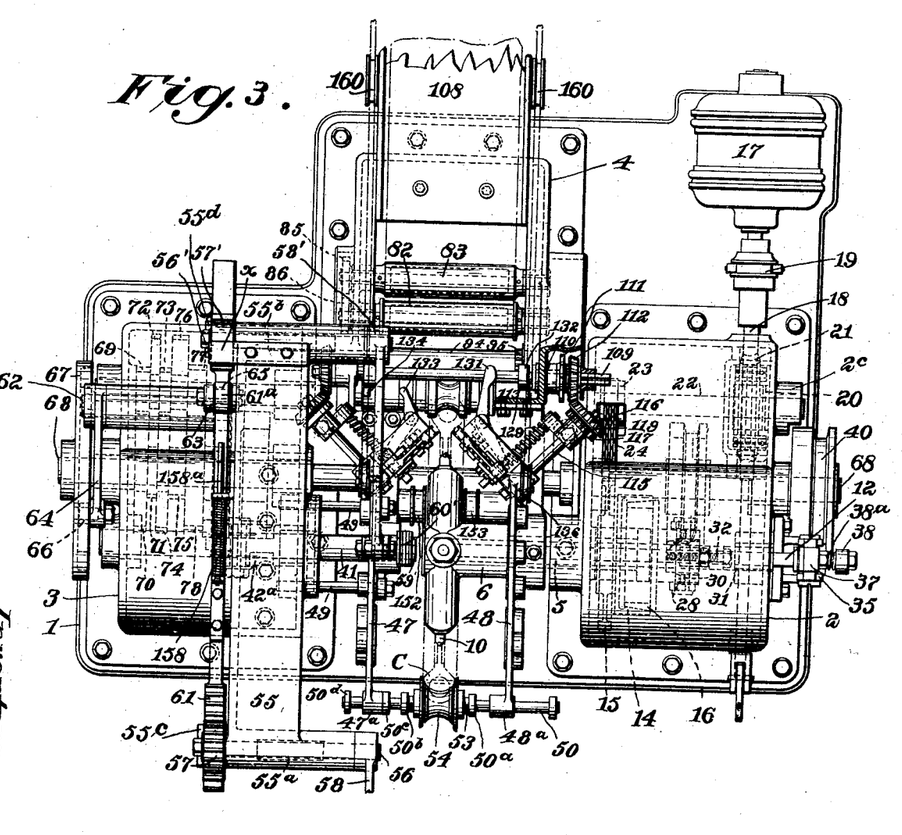
Fig. 3 is a plan view.
Figures 4, 11:
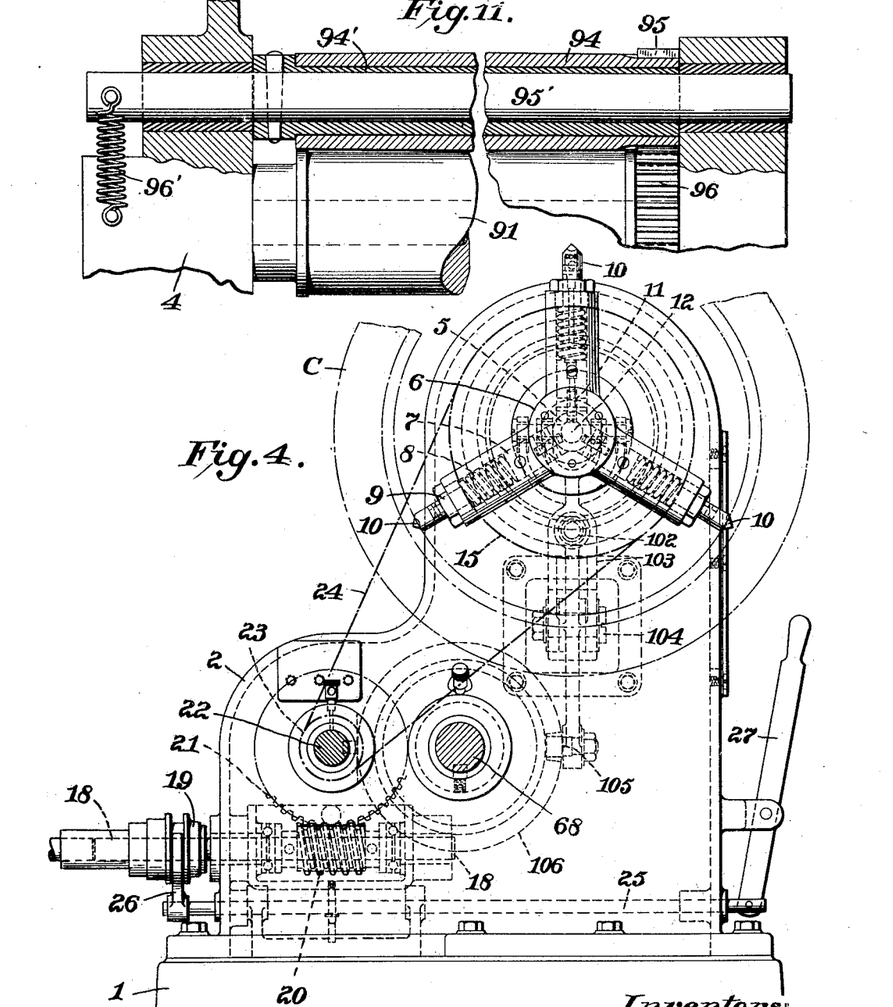
Fig. 4 is an enlarged detail view of the chuck and its operating mechanism.
Fig. 11 is a sectional detail of the eccentric sleeve or quill.

Spiders 47 and 48 are provided with corresponding alined bosses $47^a$, and $48^a$, $47^b$, and $48^b$, $47^c$ and $48^c$ in which shafts 50, 51 and 52 are respectively freely mounted so as to extend between the two spider frames at equal distances from the axis of said frames (see Fig. 3). Shaft 50 supports a quill 53 between bosses $47^a$ and $48^a$. Quill 53 is free to rotate on shaft 50 but is restrained from lateral motion thereon by fixed collars $50^a$ and $50^b$ (Fig. $5^b$) and carries a concave roller 54 shaped to the contour of the tire core. Shaft 50, and consequently roller $54^b$ thereon, is free to move axially between bosses $47^a$ and $48^a$ (Fig. 3) within the limits established by fixing collars $50^c$, $50^d$ flanking boss $47^a$ at suitable distances therefrom. Shafts 51 and 52 are provided with similar mechanism including rollers $54^a$ and $54^b$.

Figure 1:
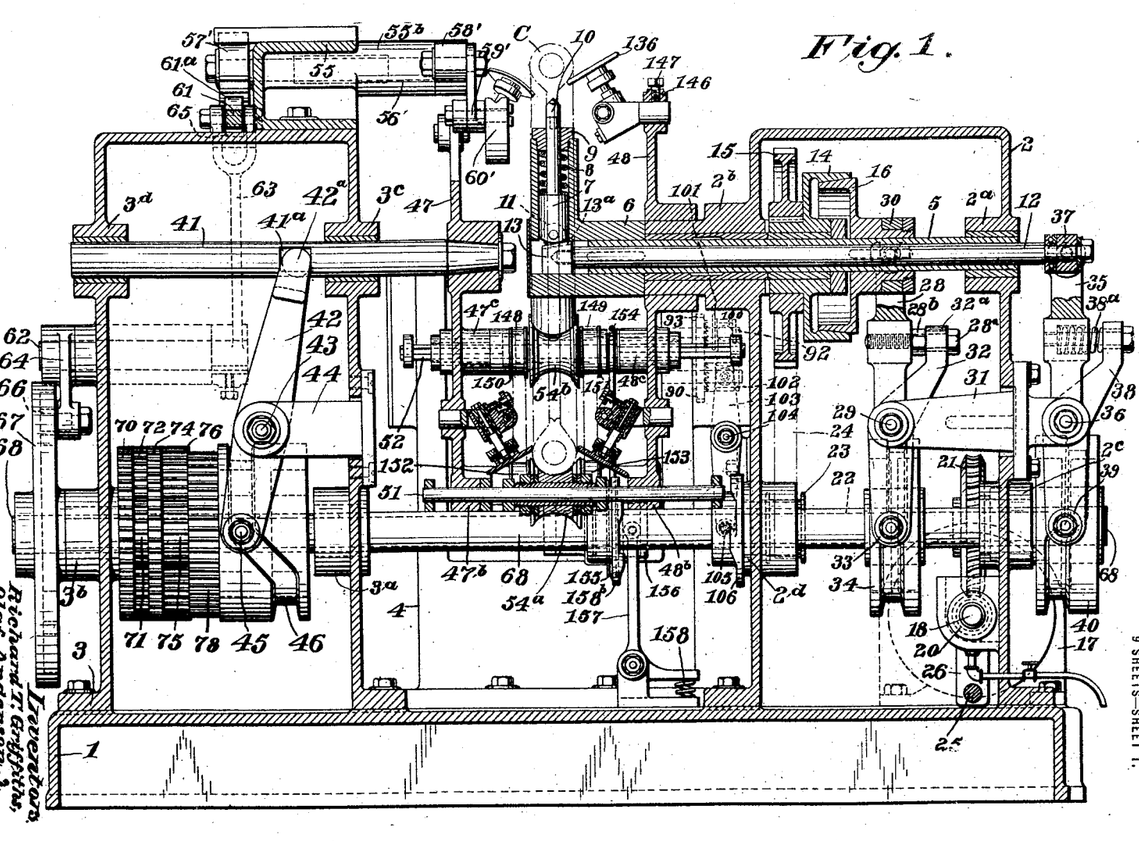
Figure 1 is a transverse vertical section through the machine.

It will readily be seen that the withdrawing of shaft 41 into frame 3 or to the left Fig. 1 causes spider 47 to move in the same direction carrying therewith shafts 50, 51 and 52 and rollers 54, $54^a$ and $54^b$. In the drawings, Figs. 1 and 2, these rollers are shown disposed in the same plane with the chuck plungers 7 and a core C is shown in dotted lines chucked on chuck points 10 and also cradled in rolls 54, $54^a$ and $54^b$. When the chuck points 10 are withdrawn from core C by the action of cam 40, as previously described, the core C will rest in the concave rolls and be supported thereby, and as cam 46 is so contoured as to withdraw shaft 41 directly subsequent to the unchucking operation, the core C will be moved bodily laterally out of the plane of the chuck 6 a sufficient distance to enable the core to be lifted vertically from the cradle formed by the rolls for the purpose of removing the core from the machine without interfering with the chuck 6. As will be hereinafter described spider 47 carries other devices for operating upon the core such as fabric shaping and bead applying devices which devices also support or bear against the core when resting on the cradle rolls, and in order to allow the core in its vertical movement to clear these devices, shafts 50, 51 and 52 are provided with the limiting stops 50$^c$ and 50$^d$ heretofore described. By this construction spider 47 moves a slight distance before rollers 54 54$^a$ and 54$^b$ start to move thus enabling the core C to clear spider 47 and the devices carried thereby.

After the core C has been thus moved laterally out of the chuck plane, it can be removed from the cradle rolls and replaced by a similar core, and the cams 46 and 40 are so contoured and timed that the new core will be moved laterally into the plane of the chuck and immediately will be chucked upon the chuck 6 by the mechanism described.

To remove the core bearing the completed tire from the cradle rolls and replace it by a fresh core we provide the following mechanism:

Securely bolted to the top of frame 3 is a cross arm 55 provided with a pair of horizontal bearings 55$^a$, 55$^b$ disposed parallel to shaft 41. A pair of similar shafts 56, 56′ are rotatably mounted in these bearings and have similar pinions 57, 57′ keyed to their outer extremities and a pair of swinging arms 58, 58′ keyed to their inner extremities. Said arms 58, 58′ are provided with studs 59, 59′ at their outer ends upon which are rotatably mounted V blocks or shoes 60, 60′ which are so made and hung as to always present their V grooves upwardly when acted on by the force of gravitation, these V blocks constituting what may be aptly termed pivotally connected saddles. A horizontal rack bar 61 (Fig. 2) is slidably mounted on bearings 55$^c$, 55$^d$ formed on cross-arms 55 so as to engage pinions 57, 57′ and, therefore, rotate arms 58, 58′ by its longitudinal movement. Rack bar 61 is provided with a vertically slotted boss 61$^a$. A shaft 62 horizontally journaled in frame 3 has a lever 63 keyed to one extremity and a lever 64 keyed to the other extremity. A roller 65 on arm 63 engages the slot 61$^a$ in the rack bar 61, and a roller 66 on arm 64 engages a cam groove in a cam 67. Rotation of cam 67 causes arm 58′ to move upwardly and assume a position about 110° from that shown in Fig. 1 and at the same time causes arm 58 to be rotated or swung in a reverse direction until V block 60 assumes the position previously occupied by V block 60′. Further rotation of cam 67 will reverse the movement just recited. V blocks 60 and 60′ are so located as to be disposed with their V grooves in the plane of the core when the core has been axially removed from the chuck by cam 46 as previously described so that movement of arm 58 by cam 67 from its horizontal position will lift core C from the cradle rolls vertically and if a second core were hanging on V block 60′ such second core would be delivered into the cradle. Cam 67 is so contoured that the core with a completed tire is removed from the cradle immediately subsequent to the lateral movement of the cradle from the chuck and a fresh core is placed therein. Cam 67 is laid out so that the core lifting mechanism may dwell while the cradle mechanism places the core in tire building position and during the subsequent building of the carcass the reverse movement of the empty core lifting mechanism takes place, leaving the arms in their initial position ready for the removal of the carcass when finished and the delivery into the machine of a new core.

Figure 5:
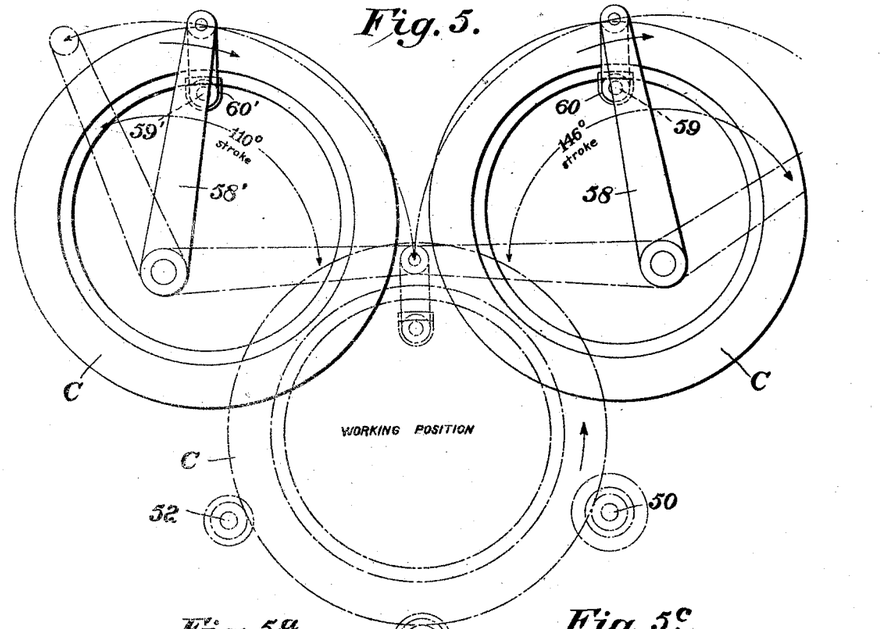
Fig. 5 is a diagrammatic view illustrating the working of the core removing and replacing arms.

The cycle of movement of the core lifting arms is shown diagrammatically in Fig. 5 in which the working position of the core is shown in dotted lines, as also are the core lifting arms when in horizontal or core lifting position. As one arm swings upward and outward to remove a core from working position the other arm moves inward and downward to supply a fresh core, the nearest point of approach of the cores to each other being illustrated by full lines.

Owing to the location of machine parts connected with the tire material feeding and applying devices and to avoid interference with these we impart to the arm 58′ a movement through an arc of approximately 110 degrees, but prefer to swing the arm 58 through an arc of substantially 146 degrees, this being accomplished conveniently by mutilating one of the gears 57′ and part of the coöperating rack and providing a stop $x$ to limit the movement of the gear.

As arm 58 reaches its outward position it dwells or remains at rest a sufficient length of time for the completed carcass to be removed therefrom and as arm 58′ reaches its outward position on the reverse movement it dwells for a sufficient length of time for a new core to be placed thereon, these loading and unloading operations being performed either by hand or by any convenient core handling devices or conveyers.

Cams 34, 40, 46 and 67 are all keyed to a single shaft 68 which extends through both frames 2 and 3 and revolves through a single revolution during the cycle of the machine. It is driven from shaft 22 parallel thereto by suitable reduction gearing consisting of a pinion 69 (Fig. 1 and 3) keyed to shaft 22 and meshing with a gear 70 rotatably mounted on shaft 68. Gear 70 has a pinion 71 fastened thereto which in turn meshes with a gear 72 journaled on shaft 22 and carrying a pinion 73, meshing with a gear 74 journaled on shaft 68 and carrying a pinion 75. Pinion 75 meshes with a gear 76, journaled on shaft 22, and carrying a pinion 77. Pinion 77 meshes with a gear 78 keyed to shaft 68.

The invention includes means for feeding strips of tire fabric to the tire core and stretching the fabric longitudinally as it is received by the core. This means includes the following mechanism:

Journaled in frame 4 parallel to the axle of the core driving shaft 5 are three shafts 79, 80 and 81 (Figs. 2, 6 and 7) on which are keyed rolls 82, 83 and 84 of equal diameters. Shafts 79, 80 and 81 each have a gear 85, 86, 87 respectively of equal diameter keyed on one end in intermeshing or driving relation with each other as clearly shown in Fig. 7. Shaft 79 also has keyed on its opposite end a gear 88 (Fig. 6) meshing with gear 90 idly supported on a shaft 89.

A fourth roller 91 is keyed to a shaft 92 which also carries a gear 93 meshing with gear 90. A fifth roller 94 mounted directly above roller 91 carries an integral or rigidly connected gear 95 meshing with a similar gear 96 fast on roll 91. Roll 94 is free to revolve on an eccentric shaft 94' and is forced toward roll 91 by a tension spring 96' (Fig. 2) one end of which is fastened to a pin projecting radially from shaft 95', the other end being anchored to frame 4.

Figures 8, 9, 10:
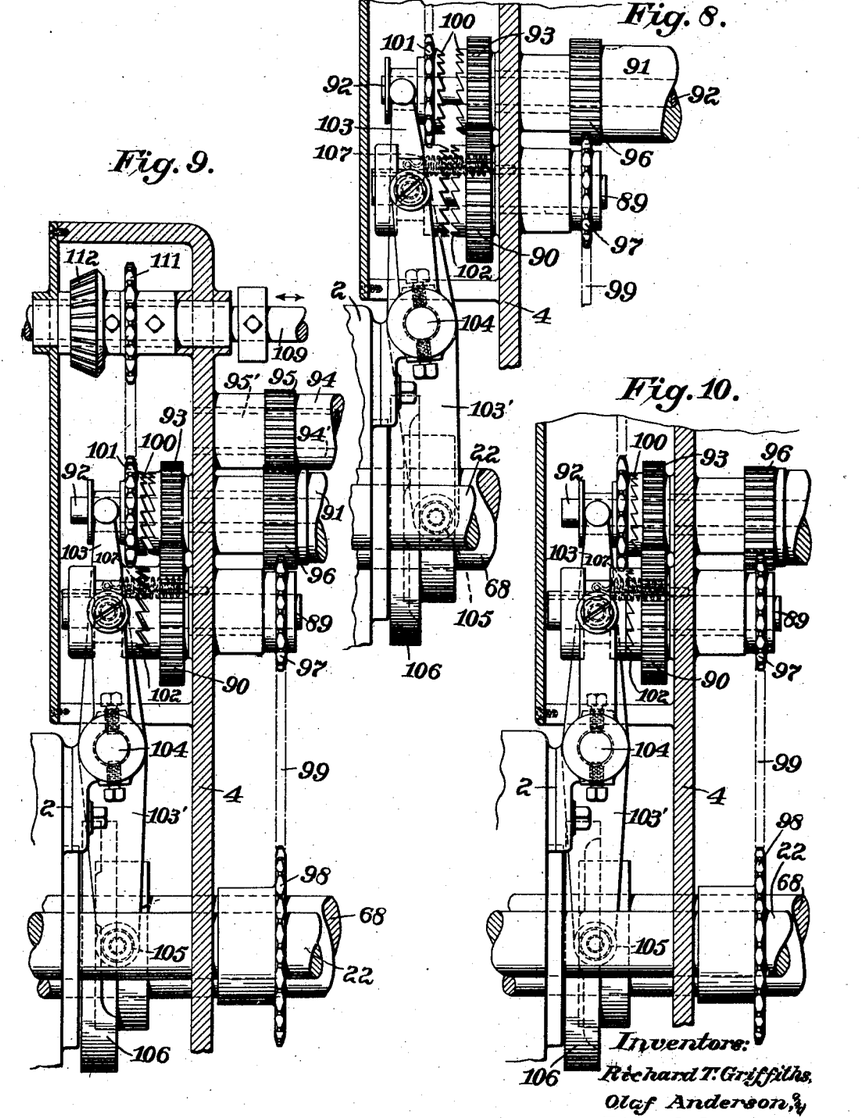
Figs. 8, 9 and 10 are detail views of driving connection with the clutches in different positions.

Shaft 89 is provided with a sprocket 97 (Fig. 6) keyed thereon by which it is continuously driven from shaft 22, a sprocket 98 and chain 99, the latter being indicated conventionally for convenience. Shaft 92 extends beyond gear 93 (Figs. 8, 9 and 10) and upon the extension so formed rotatably supports one member of a ratchet clutch 100 integral with or fast to a sprocket 101, the other member of the clutch being integral with or fast on gear 93. Stub shaft 89 is extended in like manner and feather keyed to receive a sliding member of ratchet clutch 102, the other member of which is fast on gear 90.

The movable members of clutches 100 and 102 are operated by a double clutch lever 103 pivoted at 104 on frame 2 and having forks engaging grooves in said clutch members and the clutch parts are so dimensioned that clutch 102 may engage gear 90 without clutch 100, engaging gear 93 but that on further movement of clutch lever 103 in the same direction both clutches will be engaged. A roller 105 carried by lever 103' engages a cam 106 rigidly mounted on shaft 68 and is urged toward cam 106 by the action of a spring 107 connecting one member of the double clutch fork with frame 104, the spring therefore tending to throw the clutches into engagement.

Figure 2:
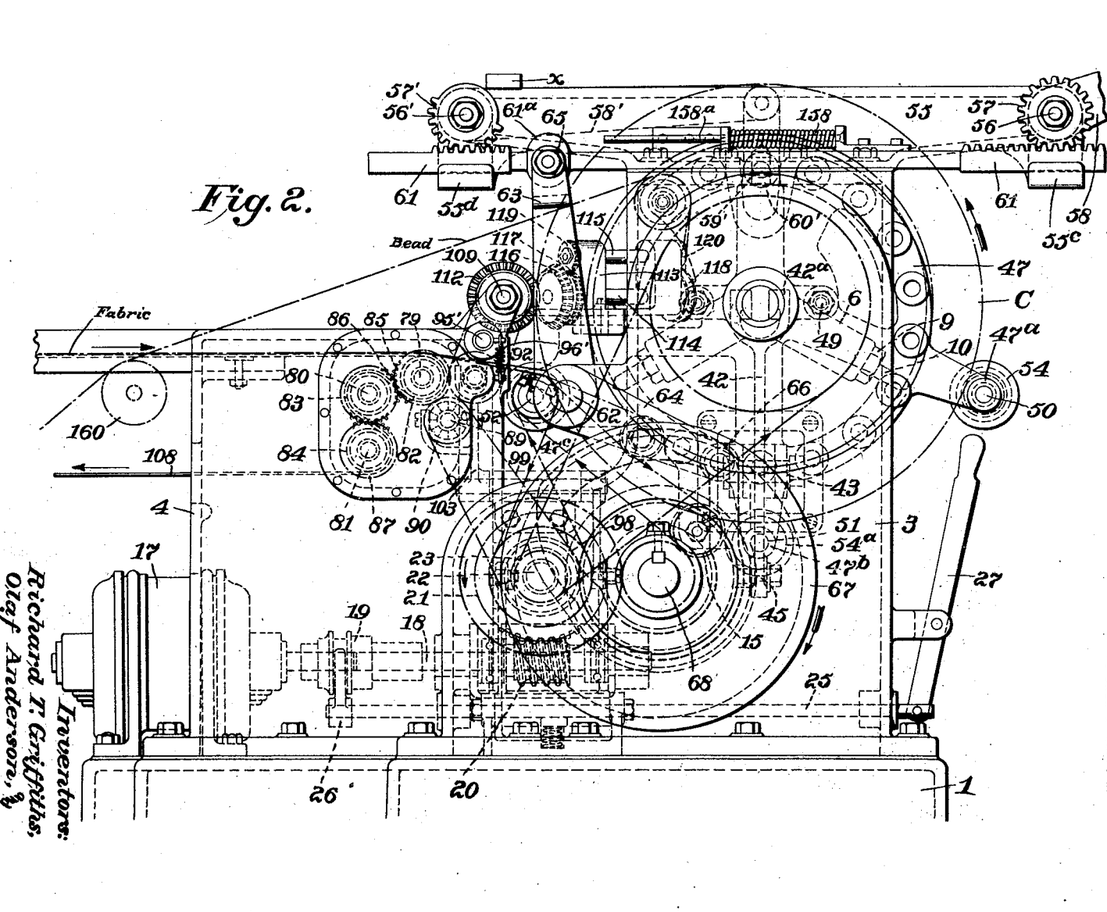
Fig. 2 is a side elevation.
Figures 6, 7:
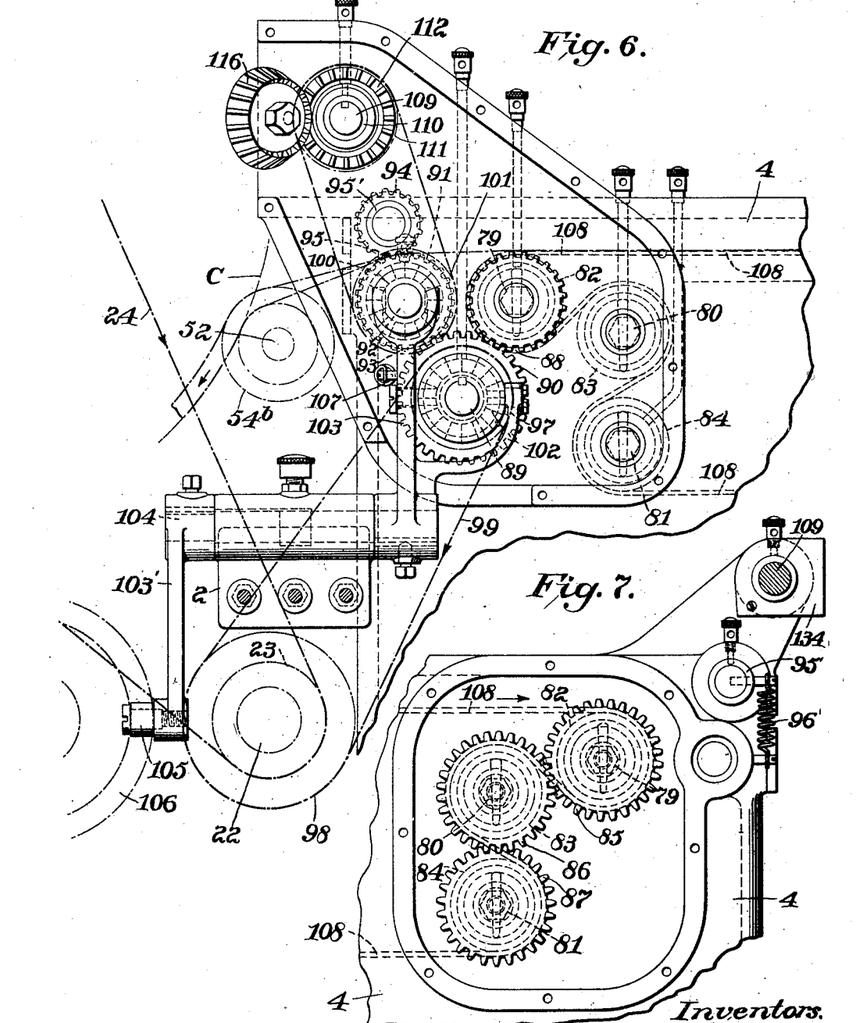
Fig. 6 is an enlarged detail view of a portion of the right hand side of the machine with the cover of the gear casing removed.
Fig. 7 is a detail view of a portion of the left side of the machine with the gear case cover removed.

A conveyer belt 108 for delivering fabric to the machine enters frame 4 from the rear and after passing around rolls 82, 83 and 84 passes out of the machine, the conveyer belt being driven by the rolls 82, 83 and 84, see Figs. 2, 6 and 7.

All of the rolls mounted in frame 4 are driven at the same surface speed, which surface speed is less by a predetermined percentage than the peripheral speed of the core C so as to stretch the fabric to the shape of the core along its central portion.

The strips of frictional fabric entering the machine follow the conveyer belt until roll 82 is reached (see Fig. 6) at which point they leave the conveyer belt and pass between pinch rolls 91 and 94 onto the core C being pressed to the core by formed flexible cradle rolls 54, 54$^a$ and 54$^b$.

These cradle rolls are shown in detail in Figs. 5$^a$, 5$^b$ and 5$^c$ and are composed of a soft or yielding rubber provided with a concaved periphery corresponding to the convex surface of the core. They are mounted on the sleeves 53 between side clamping plates 54$^x$ secured in position by locking rings as shown.

In connection with the cradle rolls 54 and 54$^a$ we provide side plates or disks $a$ and $a'$ which tend to draw or press the sides of the fabric inward around the core.

The belt is preferably made sufficiently long to carry a sufficient number of plies to form a complete tire, each ply being of a length sufficient to go once completely around the core. Said plies are stitched down over the sides of the core and under and over the beads by devices hereinafter described and after a certain number of plies have been laid bead cores are automatically applied prior to the application of the remaining plies, and the construction and operation of these bead applying devices will, for convenience, be now described.

Figures 12, 19, 20, 21:
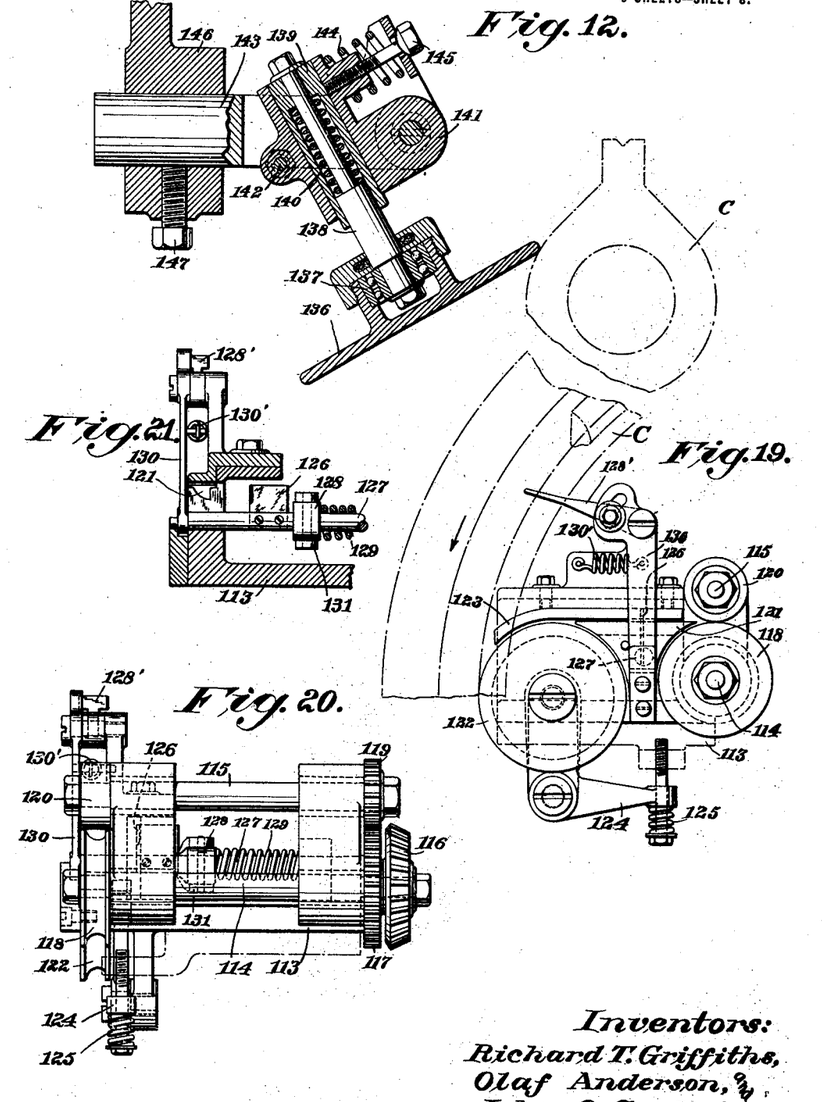
Figs. 12 to 18 inclusive are detail views of the devices for "stitching" down or shaping the fabric around the core and beads.
Figs. 19 to 21 inclusive are detail views of the bead applying and cutting devices.

Supported in suitable bearings on frame 4 is a shaft 109, Figs. 1 and 3. A quill shaft 110 is rotatably mounted in one of the bearings around the shaft 109 (Fig. 6) and is feather-keyed to shaft 109 passing therethrough. The quill shaft 110 has mounted thereon a sprocket 111 and a bevel gear 112. A bracket 113 is rigidly mounted on frame 4 and is provided with horizontal bearings for a pair of parallel shafts 114 and 115 (Figs. 19 and 20). These shafts are located horizontally and in a plane at about 45° to shaft 109, and shaft 114 has a bevel gear 116 mounted thereon for engagement with gear 112. Shaft 114 also carries a spur gear 117 and a formed roller 118 contoured to the shape of the bead core. Shaft 115 carries a spur gear 119 meshing with the gear 117 and a roller 120 mounted above roller 118. Rollers 118 and 120 are driven at uniform surface speeds for feeding a continuous length of bead core. Bracket 113 is provided with a guide way for receiving the bead core issuing from the feed rolls 118, 120 and delivering it between a formed presser roll 122 and a curved guide 123. Presser roll 122 is mounted in proper position to place the bead upon the fabric plies on core C and press it thereto, and is mounted upon a pivoted arm 124 and which is under pressure of a spring 125. Guide way 121 is intersected by a slot in which is mounted a knife 126. The knife 126 is fastened to a sliding shaft 127 (see Fig. 21) mounted on bracket 113 and has a collar 128 pinned thereon. A spring 129 is impinged at one end against the bracket 113 and at the other against the collar 128 tending to force the knife 126 into the guideway 121. Shaft 127 is prevented from such movement by a detent 130 pivoted to the bracket 113 and normally held by a spring 130' in such a position as to prevent endwise movement of the shaft 127. A trigger 128' carried by detent 130 is designed to obstruct the path of a bead core placed upon the core C so that assuming that the bead core has been fed to the carcass by nearly a complete circumference, the first end applied would on further revolution of the core press downwardly on trigger 128', moving detent 130 and allowing knife 126 to sever the bead core passing through guideway 121. Further rotation of the core would then feed forward the remaining end of bead core which would be rolled into place by roller 122.

Trigger 128' may be so adjusted as to cut the bead core at the proper point to exactly complete a circumference of the desired diameter. Sprocket 111 is driven by a chain (shown for convenience in dotted lines, Fig. 6) from sprocket 101, and the bead device is only driven when clutch 100 is engaged with gear 93. A similar bead device to that just described for placing a bead on the opposite side of the core is mounted on movable bracket 47 in order to be carried out of operative position when removing the core and is driven by a similar bevel gear from shaft 109, which spider bracket 47 carries endwise in its movements. A bent lever 131, Fig. 3, on the bead device first described is obstructed by a collar 132 on the sliding shaft 109 and, during such backing out movement of bracket 47 lever 131 is swung on its pivot. The opposite end of lever 131 engages the collar 128 on knife shaft 127 (see Figs. 20 and 21) and retracts the knife from the guideway 121 allowing the spring 130'' to swing the detent 130 into its set position. The mechanism thus described sets the bead apparatus for further operation on the next core. The bead apparatus described as mounted upon bracket 47 is provided with a similar bent lever 133 which in the backing out movement is operated by coming in contact with a stop 134 stationarily mounted upon frame 4, thus resetting both bead devices at the same time.

Means have been described by which the fabric strips are fed to the core and bead cores likewise fed in and placed. A cam 106 has been mentioned as controlling these feed devices and this cam is so laid out that the plies of fabric, which are applied before the beads are placed, are fed in continuously but spaced apart on the conveyer belt, so as to properly space the splices, while the core also revolves continuously; such feeding being accomplished by the cam 106 holding the clutch 102 into engagement with the gear 90, during this time. When it is required to place the beads, the cam 106 imparts further movement to lever 103' and thus forces clutch 100 into engagement. As clutch 100 brings into operation the bead device and as the bead device is angularly in advance of the fabric applying device the beads are applied followed by a ply of fabric in the same operation and the beads will be completely applied before the fabric is completely applied. The remaining plies of fabric are continuously fed on as before the placing of the beads without operation of the bead device, the cam 106 being so contoured as to accomplish this.

The bead strips are supplied in continuous lengths from any suitable point, preferably at or near the initial end of the feed table, being led over guide rollers 160 (see Figs. 2 and 3) which are preferably depressed below the upper surface of the bead table to be out of the way, the line of travel of the bead material being indicated in dotted lines in said figures.

Reference has hereinbefore been made to means for smoothing or stitching the fabric after its central portion has been stretched upon the core. This mechanism consists of a series of stitcher wheels 136 mounted on the spiders 47 and 48, each side of the core (see Fig. 1) and arranged to progressively lay the fabric to conform to the proper shape both under and over the bead cores. These wheels 136 are each mounted on ball bearings 137 (see Fig. 12) so as to freely revolve upon shafts 138, which are slidably mounted in cylinders 139 and resiliently cushioned therein by coil springs 140. Barrels 139 are slidably mounted for adjustment in split brackets 141 and may be locked in any desired position by clamp screws 142.

Brackets 141 are pivotally mounted in bifurcated brackets 143 and are urged toward the core C by springs 144 and prevented from moving more than desired by limiting screws 145. The brackets 143 have round shanks fitting suitably sockets 146 in brackets 47 and 48 in which they are locked in position by set screws 147. Sockets 146 are spaced around brackets 47 and 48 at varying distances from the centers thereof, and by means of the described adjustment features the disks 136 are so set or positioned as to contact with the fabric at stepped intervals, each pair accomplishing the laying of the fabric over a certain zone. The construction and arrangement of the main stitching wheels is shown on an enlarged scale in Fig. 12.

Figure 13:
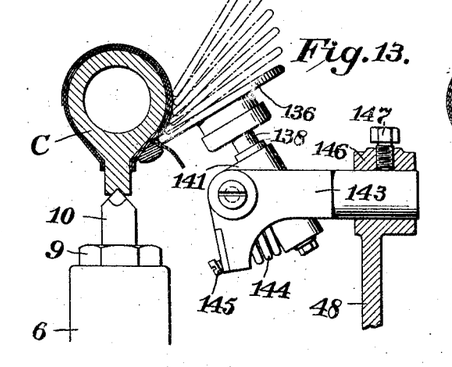

The position of the first five pairs of wheels relative to the core are shown by the dotted lines in Fig. 13 and the sixth by the full lines in said figure. The positions of the succeeding wheels are shown in Figs. 14 to 18 inclusive.

Figure 14:
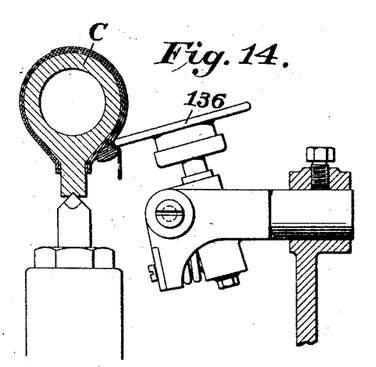
Figure 15:
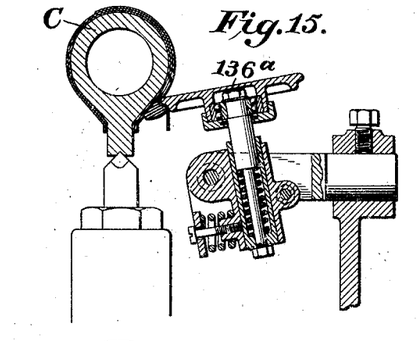
Figure 16:
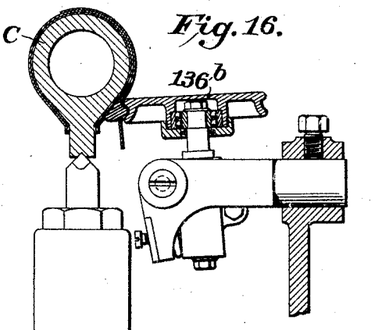
Figure 17:
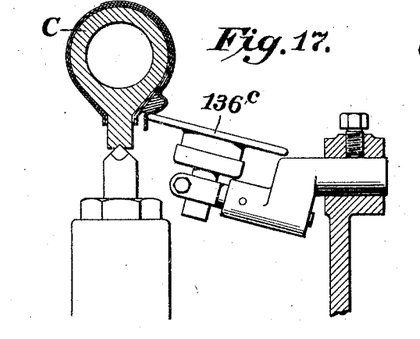
Figure 18:
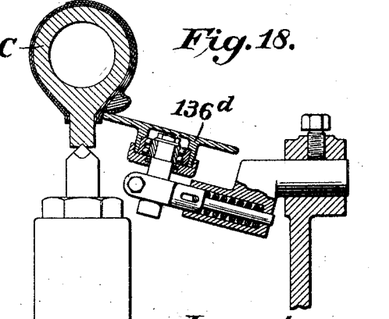

It will be understood that all of these disks or wheels operate to shape the plies down to the base of the core prior to the application of the beads. Those following the sixth position, however, must in addition work the fabric into the creases of the beads and also around and beneath the bottom faces of the beads. To accomplish this efficiently the wheels are positioned or constructed as shown in Figs. 14 to 18. Referring first to Fig. 14, it will be noted that the wheel is positioned in a more nearly horizontal plane to press the ply laterally into the crease of the bead. The two succeeding wheels $136^a$ and $136^b$ are located in substantially similar position but have peripheral faces shaped to conform to the contour just of a portion of the outer face of the bead and second to substantially the whole outer face as shown in Figs. 15 and 16 so that the plies are worked around the bead in position to be engaged by the plain edged wheel $136^c$ and thereafter by the similarly shaped wheel $136^d$, these latter being mounted in a plane reversed to that of the wheel of Fig. 14 so as to exert an upward as well as inward pressure and work the plies into close contact with the under side of the bead. Each ply of fabric is completely laid down to the core, or to the preceding ply, in one complete revolution of the core.

Experience has shown that with a smoothing device like that described when used alone, difficulty is experienced in the stitching disks tending to force back the first or advanced end of the ply and in order to counteract this force this invention is provided with means to rapidly brush the advancing end of the ply forward at a greater speed than the speed of the core. For this purpose an endless belt 148, 149, is provided at each side of the core C mounted upon pulleys supported by brackets 47 and 48 (see Fig. 1). Two of these pulleys 150 and 151 are mounted journaled in bosses $47^c$ and $48^c$ and engaging feather keys on shaft 52 with their pulley portions flanking cradle roller 54. The other two pulleys are journaled in bosses on frames 47 and 48 and are designated by numerals 152 and 153. Pulley 151 is provided with a groove for receiving a belt 154. A similar belt pulley 155 is journaled on shaft 22 and may be connected thereto by a clutch 156, when it is desired to operate the belt mechanism driven thereby.

Clutch 156 is operated by a clutch lever 157 acted upon by a spring 158 tending to clutch the pulley 155. A cam $158^b$ mounted upon shaft 68 holds the clutch 156 out except when a ply of fabric is just starting onto the core at which time the belts are driven and brush the fabric ahead until the end has been completely applied when clutch 156 is thrown out, this action occurring at the start of each ply.

It will be readily understood that all of the operations of the machine are controlled by the set of cams mounted upon the cam shaft which makes one revolution for each tire constructed and the cams are properly laid out and timed so that the operation of the machine is as follows:

A core, which has been previously cleaned and cemented, is hung on the saddle of arm 58' when the latter is in the extreme left hand position shown in dotted lines in Fig. 5. The motor 17 is supplied with a suitable current of electricity and the arm 58' swings the core into the cradle mechanism. The cradle mechanism carries the core laterally into chucking position and stops, the chuck jaws then expand chucking the core and immediately thereafter the chuck starts to revolve carrying with it the core, and the plies of fabric are fed in by the fabric mechanism and applied by the cradle rolls and the stitching mechanism. Before starting the machine the operator has placed the proper number of plies, at the proper distances apart to space the splices, on the conveyer belt which is preferably sufficiently long to accommodate all the fabric plies to be incorporated in a tire. When the beads are to be placed, the bead mechanism starts just preceding the delivery of the first end of the ply which covers the bead cores, thus at the same time laying the bead cores with a ply of fabric, thereupon the bead is severed at the proper time, as described previously, and the bead apparatus thrown out of operation while the fabric apparatus remains in action.

Thereafter other plies are applied in the same manner as those preceding the placing of the beads, until the proper number of plies are incorporated in the tire, whereupon the fabric feeding device stops for the first time. The chuck then stops rotating and the chuck jaws are withdrawn, the core carrying its carcass now rests in the cradle which moves outwardly into position to aline with arm 58.

During the building operation arm 58' has returned to its original position and arm 58 has descended into the machine and the operator has placed another empty core on arm 58'. Arm 58 now ascends bringing with it the core carrying the finished carcass and at the same time arm 58' descends placing the new core in the machine and the cycle is completed.

In case clutch 26 is now left in, the cycle will be repeated upon the next core and so on *ad infinitum*, it being only necessary for the operator to keep the machine supplied with fabric plies, bead cores, and tire cores, and to remove the finished tires.

As the cores are placed in the machine by arm 58' and removed therefrom by arm 58 the rack bar when moving in one direction is subjected to the load of the cores, but is undoaded on the reverse movement. To compensate for this we provide a counterbalancing spring 158 which encircles a guide rod 158ª between lugs which are carried respectively by the rack bar and a stationary part of the machine frame, the rod being fast to one lug and slidable through an opening in the other as clearly shown in Figs. 1 and 3. While the arms are moving under unloaded or empty condition the spring is being compressed and thus the load on the cam is equalized.

Having thus described my invention what I claim is:

1. In a tire building machine the combination with a core supporting chuck having means for engaging and releasing the core, of a pair of alternately acting devices for alternately placing a core in the chuck and removing it therefrom.

2. In a tire building machine, the combination with a core supporting chuck having means for engaging and releasing the core, of a pair of swinging core-carrying arms with means for alternately operating them to present a core to the chuck and remove it therefrom.

3. In a tire building machine the combination with a core supporting chuck having means for engaging and releasing a core, of a swing arm adapted to receive a core, and means for swinging said arm automatically toward and from the chuck.

4. In a tire building machine the combination with core supporting means of core transferring means comprising a swinging core carrying arm with means for operating it, and a core receiving saddle pivotally connected to the extremity of said arm.

5. In a tire building machine a rotary chuck having means for engaging and releasing a core, an arm swinging on a horizontal axis and carrying a pivoted core engaging saddle on its free end, means for moving the core laterally when released from the chuck to position it on said saddle and remove it therefrom, and means for swinging said arm.

6. In combination, a rotary chuck, means for automatically causing said chuck to engage and release a core, a pair of arms pivoted on a fixed axis to swing in a plane paralled to the plane of the core, core engaging saddles carried by said arms, automatic means for moving a core when released from the chuck into alinement with a saddle and vice versa, and automatic means for alternately swinging said arms.

7. In a tire building machine, the combination with a core chuck, of a pair of swinging arms fitted to support cores at their outer ends, gears connected with the hubs of said arms, racks engaging said gears and means for operating said racks.

8. In a tire building machine, a core chuck having radially movable core engaging arms, means for automatically moving said arms to engage and release a core, and automatically operated swinging arms for presenting the cores to and removing them from the chuck.

9. In a tire building machine, a chuck having means for engaging and releasing a core, rollers beneath the chuck in core engaging position, and means for moving said rollers laterally away from the plane of the chuck when the core is disengaged therefrom.

10. In a tire building machine, a chuck having means for engaging and releasing a core, rollers beneath the chuck in core engaging position, and means for moving said rollers laterally away from the plane of the chuck when the core is disengaged therefrom, and means for removing the core from said rollers.

11. In a tire building machine, a chuck having means for engaging and releasing a core, rollers beneath the chuck in core engaging position, means for moving said rollers laterally away from the plane of the chuck and returning them to said plane, and means operating in the plane of core for removing one core from the rollers and placing a new one thereon.

12. In a tire building machine, a chuck for supporting a core, means for supporting the core when released from the chuck, said means being displaceable relative to the chuck for removing the core from the plane of the chuck, and means for supplying the cores to and removing them from said supporting means.

13. In a tire building machine, a chuck having core engaging and releasing means, a plurality of concaved rollers journaled on axes equidistant from the axis of the chuck, and in engagement with the core, and means for bodily moving said rollers endwise to carry the core to and from the plane of the chuck.

14. In a tire building machine, a chuck having core engaging and releasing means, a plurality of concaved rollers journaled on axes equidistant from the axis of the chuck, means for bodily moving said rollers endwise to carry the core to and from the plane of the chuck, and means for supplying cores to and removing them from the rollers.

15. In a tire building machine, a revoluble chuck having devices for engaging and releasing a core, a core supporting cradle beneath the chuck, and means operating in unison with said engaging and releasing devices for moving said cradle laterally relative to the chuck.

16. In a tire building machine a core carrying chuck with means for engaging and releasing a core, and two sets of tire material applying means for acting on opposite sides of said core, one of said sets being movable laterally away from the plane of the core to permit removal of the core from the chuck.

17. In a tire building machine a core carrying chuck with means for engaging and releasing a core, and two sets of tire material applying devices arranged on opposite sides of the core respectively, a fixed support for one of said sets, and a support for the other set which is movable toward and from the first named set.

18. In a tire building machine a hollow shaft journaled in a fixed support, means for driving said shaft, a chuck carried by said shaft having radially movable core engaging members, a rod slidable within said hollow shaft and projecting beyond the end remote from said chuck, means whereby the movement of said rod operates said members to engage and release the core, and means connected with said projecting portion of the rod for operating it.

19. In a tire building machine, a hollow shaft journaled in a fixed support, a chuck carried thereby having radial guides and a hollow hub, normally retracted core engaging devices slidable in said guides, rollers on the inner ends of said members projecting into the hollow hub, a slidable block within said hub having grooves with inclined bottoms engaged by said rollers, and means operating through said hollow shaft for moving said block.

20. In a tire building machine a revoluble core holding chuck, fabric feeding means, and a plurality of relatively stationary fabric applying and shaping devices disposed on each side of the chuck, one set of said devices being mounted on a fixed support, and the other set being mounted on a movable support which is movable bodily toward and from said fixed support.

21. In a tire building machine, a revoluble core carrying chuck, a core receiving cradle positioned in proximity to the under side of the core, devices for applying tire fabric to the core located on opposite sides of the core, a fixed support carrying the devices on one side, a movable support for the devices on the other side, means for moving the movable support away from the fixed support and means for imparting to the cradle a similar movement of less extent.

22. In a tire building machine, a rotatable core carrying chuck, two sets of fabric stitching devices for applying tire material to the core and located respectively on opposite sides of the core, a fixed support carrying the set on one side, a movable support for the set on the other side and means for moving said movable support toward and from the fixed support.

23. In a tire building machine, a revoluble core carrying chuck, channeled rollers arranged in proximity to the under side of said core, means for feeding tire material to the core, and devices for applying the material located on opposite sides of the core, one set of devices being carried by a fixed support and the other by a movable support, means for moving the movable support away from the fixed support, and means for moving said rollers a less distance than said fixed support.

24. In a tire building machine, a revoluble chuck carrying core engaging and releasing means, spiders non rotatably mounted on each side of the core, one of said spiders being movable toward and from the plane of the chuck, means carried by said spiders for applying tire material to the core, a plurality of rods or shafts slidably supported by the lower portions of said spiders, cradle rollers carried by said shafts, and stops on said shafts for determining the sliding movement thereof.

25. In a tire building machine, a revoluble chuck carrying core engaging and releasing means, spiders non rotatably mounted on each side of the chuck, one of said spiders being movable axially of the chuck, devices carried by said spiders for applying tire material to the core, a core supporting cradle, and means whereby said cradle will be moved in unison with the movable spider but to a less degree.

26. In a tire building machine, a revoluble chuck carrying core engaging and releasing devices, spiders located on opposite sides of the chuck, one of said spiders being movable axially of the chuck, devices carried by said spiders for applying tire material to the core, and cradle mechanism for the core carried by said spiders, comprising a plurality of slidable shafts supported by the spiders, a quill shaft on each of said slidable shafts, a cradle roller on each quill shaft, collars on each said slidable shaft opposed to the ends of the quill shaft, and spaced stops on each slidable shaft coöperating with the bearing portion of the movable spider.

27. In a tire building machine, a revoluble core supporting chuck, means for feeding tire material thereto, a pair of spiders arranged on opposite sides of the chuck, one of said spiders being movable toward and from the chuck, and means for applying the tire material to the core comprising a plurality of rotatable disk like members supported by said spiders to act successively on different portions of the core.

28. In a tire building machine, a revoluble core supporting chuck, means for feeding tire material thereto, a pair of spiders arranged on opposite sides of the chuck, one of said spiders being movable toward and from the chuck, and means for applying the tire material to the core comprising a plurality of rotatable disk like members supported by said spiders to act successively on different portions of the core, each of said members being capable of an axial and lateral yielding movement.

29. In a tire building machine, a revoluble core supporting chuck, means for feeding tire material thereto, a pair of spiders arranged on opposite sides of the chuck, one of said spiders being movable toward and from the chuck, and means for applying the tire material to the core comprising a plurality of rotatable disk like members supported by said spiders to act successively on different portions of the core, each of said members being capable of an axial and lateral yielding movement, part of said members having rounded edges and part recessed edges for also shaping the fabric around the bead.

30. A device for applying fabric to a tire core comprising a supporting bracket, a socket member pivotally mounted in said bracket to swing toward and from the core, a spring for swinging said socket member, a spring pressed plunger mounted in said socket, and a stitching member rotatably carried by said plunger.

31. A device for applying fabric to a tire core comprising a supporting bracket, a second bracket pivotally connected to said first named bracket and having a socket, a spring acting on said second bracket to swing it bodily about its pivot, a tubular member adjustably held in said socket, a spring pressed plunger in said tubular member, and a stitching wheel journaled on said plunger.

32. A device for applying tire fabric to a core comprising a supporting member, a bracket carried thereby, a second bracket pivotally attached to the outer end of said first named bracket, the main body of said bracket lying between its pivotal axis and said supporting member, a spring acting on said second bracket on one side of its pivoted axis, and a stitching device rotatably supported by said second bracket on the opposite side of its pivotal axis.

33. A device for applying fabric to a tire core comprising a supporting member, a bracket pivotally attached thereto, a spring for acting on said bracket tending to swing it around its pivot, said bracket having a split socket, a sleeve, clamped within said socket, a plunger held within said sleeve, a spring acting on the inner end of said plunger, and a stitching wheel journaled on the outer end of said plunger.

34. In a tire building machine, a revoluble core, a pair of spiders arranged on opposite sides thereof, and a plurality of fabric stitching devices carried by each spider, each comprising a bracket member adjustably connected with the spider, a second bracket member yieldably pivoted with said first named bracket member, and a stitching wheel rotatably carried by said second member and capable of axial yielding movement.

35. In a tire building machine, a revoluble chuck, a pair of spiders located on opposite sides thereof having lateral openings, brackets having shanks held in said openings to have rotary and axial adjustment therein, socket members yieldably carried by said brackets, plungers yieldably carried by said socket members, and stitching devices carried by said plungers.

36. In a tire building machine, a revoluble core carrying chuck, means acting continuously during the building of a complete tire for applying fabric to and shaping it around the core, and intermittently acting means for feeding bead material in strip form and applying it progressively after a predetermined number of fabric plies have been applied.

37. In a tire building machine, a revoluble core carrying chuck, means acting continuously during the building of a complete tire for applying fabric to and shaping it around the core, and intermittently acting means for feeding bead material in strip form and applying it progressively after a predetermined number of plies have been applied, part of said fabric applying means being constructed and adapted to apply the fabric to the inner part of the core prior to the laying on of the bead material and also to shape the following fabric plies over the beads after the latter have been applied.

38. In a tire building machine, a revoluble core carrying chuck and a plurality of annularly disposed stitching wheels on each side of the chuck, said wheels having their axes arranged at successively varied angles to the axis of the core.

39. In a tire building machine, a revoluble core carrying chuck, stitching devices for applying tire fabric to the core, means for feeding the fabric, and brushing means for causing the advanced edge of the fabric to adhere to the core.

40. In a tire building machine, a revoluble core carrying chuck, stitching devices for applying tire fabric to the core, means for feeding the fabric, and brushing means for causing the advanced edge of the fabric to adhere to the core, said means including an endless moving element having a greater surface speed than the speed of the core.

41. In a tire building machine, a revoluble core carrying chuck, stitching devices for applying tire fabric to the core, means for feeding the fabric, and brushing means for causing the advanced edge of the fabric to adhere to the core, said means including a pair of endless belts located on each side of the core in proximity thereto and having a greater surface speed than the speed of the core.

42. In a tire building machine, a revoluble core carrying chuck, stitching devices for applying tire fabric plies to the core, brushing means for acting on the core, and means automatically rendering said brushing means inactive except when the advanced edge of a ply is in proximity to a core.

43. In a tire building machine, the combination with a revoluble core carrying chuck and fabric applying devices, of fabric feeding means comprising a substantially horizontally disposed endless belt having an exposed upper surface to support and convey strips of fabric and having one end in proximity to the core, and means for feeding fabric plies from the belt to the core.

44. In a tire building machine, the combination with a revoluble core carrying chuck, and fabric applying devices, of a plurality of inter-geared rollers adjacent said core, and an endless ply-carrying belt passing around part of said rollers, said belt being of substantially the same width as the plies and positioned to receive and convey said plies on its upper surface.

45. In a tire building machine the combination with a revoluble core carrying chuck and fabric applying means associated therewith, of a plurality of inter-geared rollers adjacent said core, a single endless fabric ply feeding belt having its central portion substantially in line with the core passing around part of said rollers, and means for causing the advanced edge of each ply, as it issues from said rollers, to adhere to the core.

46. In a tire building machine, the combination with a revoluble automatic core chucking means and automatic fabric applying devices, of fabric feeding means comprising an endless belt having an exposed upper surface extending substantially horizontally a sufficient distance to support a plurality of fabric plies disposed thereon end to end, said belt having one end disposed in proximity to the core, and means for feeding the fabric plies from the belt to the core.

47. In a tire building machine, the combination with a revoluble automatic core chucking means and automatic fabric applying devices, of fabric feeding means comprising an endless belt having an exposed upper surface extending substantially horizontally a sufficient distance to support a plurality of fabric plies disposed thereon end to end, said belt having one end disposed in proximity to the core, supporting means for said endless belt disposed in fixed relation to the core.

48. In a tire building machine, the combination with a revoluble core carrying chuck with means for automatically loading and unloading the core therefrom, of a fabric pressing roller of resilient material positioned to coöperate with the core.

49. In a tire building machine, the combination with a revoluble core carrying chuck with means for automatically loading and unloading the core therefrom, and means for feeding and applying fabric to the core, of a concaved roller of rubber positioned to coöperate with the core.

50. In a tire building machine the combination with a revoluble core carrying chuck and fabric feeding and applying devices, of a concaved roller journaled to contact with the core, and disks carried at each end of said roller and projecting beyond the surface thereof.

51. In a tire building machine the combination with a revoluble chuck carrying core and fabric applying devices, of means for supporting a plurality of separated plies of fabric and feeding said plies successively to said applying devices.

52. In a tire building machine the combination with a revoluble chuck carrying core and means for applying fabric and bead material to said core, of an endless substantially horizontally disposed belt for supporting a plurality of detached plies, and means located on opposite sides of the belt for feeding bead material in strip form.

53. In a tire building machine the combination with a revoluble core carrying chuck, and fabric applying devices, of bead material applying means comprising a curved guide adjacent the core and a revolving channel roller adjacent said guide.

54. In a tire building machine the combination with a revoluble core carrying chuck, and fabric applying devices, of bead material applying means comprising a curved guide adjacent the core and a spring pressed revolving channel roller adjacent said guide.

55. In a tire building machine the combination with a revoluble core carrying chuck and fabric feeding and applying devices, of means for feeding strips of bead material to opposite sides of said core, and means for automatically severing said bead material.

56. In a tire building machine the combination with a revoluble core carrying chuck and fabric feeding and applying means, of means for feeding and applying bead strips to opposite sides of the core, and means automatically operated by the advanced ends of the applied portions for severing said strips.

57. In a tire building machine the combination with a revoluble core carrying chuck and fabric feeding and applying means, of bead strip feeding means on each side of the core comprising a guide and feeding roller, a spring pressed knife arranged to intersect the guide, trigger means having a part arranged in the path of the end of the applied bead, for releasing the knife, and means for restoring the knife to initial position.

58. In a tire building machine, a revoluble core carrying chuck, means for intermittently rotating it through a predetermined period, means for automatically applying a core thereto and removing it therefrom, means for automatically applying to said core during its cycle of operation tire fabric sufficient to build the tire, and means operative during a portion of said cycle for automatically feeding and progressively applying bead material in strip form.

59. In a tire building machine, a chuck carrying core, means for automatically rotating it through a predetermined number or cycle of revolutions, means continuously operative during said cycle to apply sufficient fabric to build a tire, and means automatically operative through one revolution to progressively apply bead material to the partially completed tire.

In testimony whereof, we affix our signatures.

RICHARD T. GRIFFITHS.
OLAF ANDERSON.
JOHN O. GOODWIN.